United States Patent [19]

Alexander

[11] Patent Number: 4,961,241

[45] Date of Patent: Oct. 9, 1990

[54] BRAKE FOR RAIL DOCK LEVELER

[75] Inventor: James C. Alexander, London, Canada

[73] Assignee: The Serco Corporation, Ontario, Canada

[21] Appl. No.: 372,977

[22] Filed: Jun. 29, 1989

[51] Int. Cl.⁵ .............................................. E01D 1/00
[52] U.S. Cl. ....................................... 14/69.5; 188/43
[58] Field of Search ...................... 14/69.5, 71.1, 71.5, 14/72.5; 188/43

[56] References Cited

U.S. PATENT DOCUMENTS

| | | | |
|---|---|---|---|
| 2,743,025 | 4/1956 | Manierre | 14/69.5 X |
| 3,299,457 | 1/1967 | Harris | 14/69.5 |
| 4,361,210 | 11/1982 | Simonds | 188/43 |
| 4,694,522 | 9/1987 | Alten | 14/72.5 |

*Primary Examiner*—William P. Neuder
*Attorney, Agent, or Firm*—Sughrue, Mion, Zinn, Macpeak & Seas

[57] ABSTRACT

A brake mechanism for a vertically storing dock leveler mounted on a carriage for lateral movement on rails relative to a dock surface. The brake is automatically actuated by means of an arm that bears against the leveler. When the leveler is lowered the arm rotates to urge a brake member into engagement with a rail thus preventing lateral movement of the carriage and leveler.

9 Claims, 1 Drawing Sheet

BRAKE FOR RAIL DOCK LEVELER

BACKGROUND OF THE INVENTION

This invention relates to dock levelers and in particular, a dock leveler which is used for loading and unloading rail cars. The invention specifically relates to a brake mechanism that prevents lateral movement of such a dock leveler when it is lowered into a working position.

Dock levelers are well known in the material handling field. These devices are typically used to span the distance between a loading dock and vehicle which is to be loaded or unloaded. One common use is to place a leveler in a pit or, at the edge of a loading dock and have it span the gap which exists between the edge of the loading dock and the bed of a truck which has been backed in for a loading and/or unloading. The leveler is stored in the pit, raised upward and then lowered so that the lip extends to provide the necessary bridge between the dock leveler and the truck bed. Since trucks are backed into discreet dock areas and are then secured by means of chocks, vehicle restraints, or the like their lateral position remains fixed. Thus, the position of the dock leveler is also fixed on its mounting frame and to the loading dock so that there is no lateral movement. Also since the truck typically backs up to within inches of the dock face it is very close to the loading dock surface.

A specialized use for dock levelers and, in particular, levelers which store vertically is to unload or load rail cars. It is this mode of utilization, the loading dock surface is disposed generally parallel the rails and there are no discreet docks as in the case of trucks. The rail car is moved into position for loading or unloading and then the vertically stored ramp is laterally placed into alignment with the rail car door. That is, the vertically stored ramp is generally itself movable on rails which are disposed parallel to those upon which the rail car moves. Movement of the dock leveler is also necessary because a rail car cannot generally be positioned with accuracy relative to a fixed point.

Thus, by mounting the leveler on rails additional utility is gained by having the leveler positionable anywhere along the loading dock to align with the door on the rail car. However, this functional requirement and flexibility also carries a disadvantage. When the dock leveler is lowered to the horizontal working position, the force exerted by fork-lift trucks which move over the ramp during loading or unloading can move the leveler sideward. Consequently, there exists in the technology a need to provide a technique for engaging and locking the dock leveler when it is lowered into a working position. Additionally, such a brake should automatically engage when the leveler is lowered into the operative position. Moreover, such a brake should be capable of adjustment so that the brake force can be varied. Finally, the braking force of such a device should remain essentially constant within the entire working range of the leveler.

SUMMARY OF THE INVENTION

Given the deficiencies in the prior art, this invention provides a brake system which is automatically actuated as the leveler is lowered into position. In accordance with this invention, a brake actuating arm rotates as the leveler is lowered. A brake pad having a backing plate is mounted on the leveler frame to engage in frictional contact with a rail. As the leveler is lowered into position, an adjusting screw bears against the backing plate and forces the brake pad against the rail. Thus, when fully lowered a uniform braking force is exerted which restrains the leveler from lateral movement along the rail. When the leveler is raised into its inoperative position the force on the backing plate is released thus allowing sliding movement on the rail so that leveler can be repositioned.

This invention will be described in greater detail by referring to the attached drawings and the description of the preferred embodiment which follows.

DESCRIPTION OF THE PREFERRED EMBODIMENT

Figure 1:
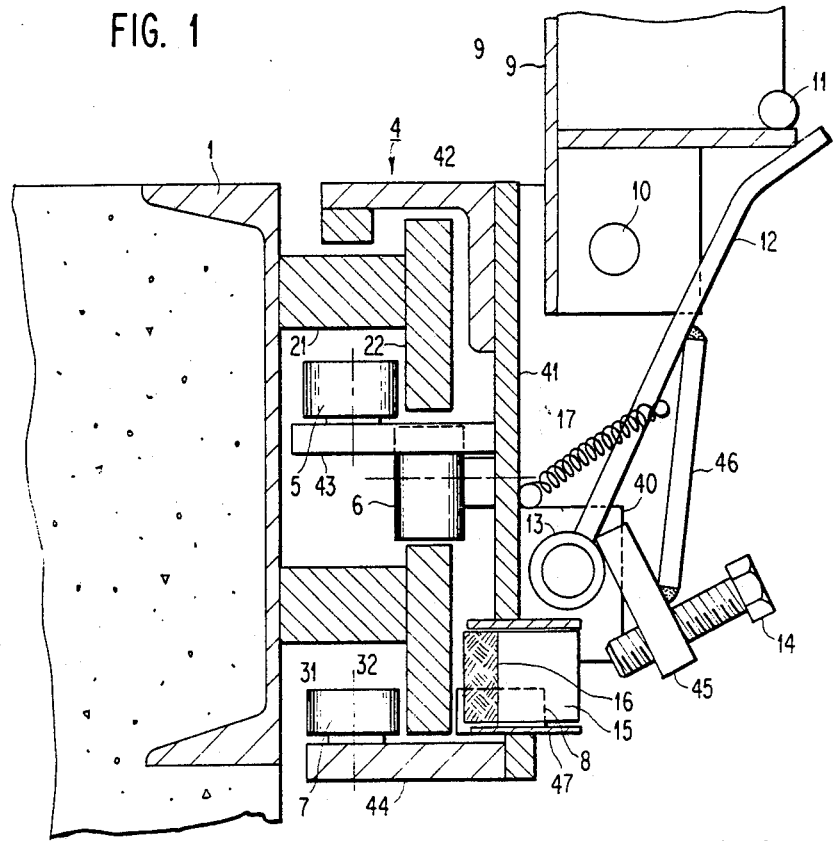
FIG. 1 illustrates the brake mechanism of the dock leveler in the stored inoperative position.

Referring now to FIG. 1, a rail dock leveler in the stored, vertical position, is depicted. FIG. 1 illustrates only a portion of the dock leveler assembly. It will be appreciated by those skilled in this technology that the dock leveler has a lip extending from the distal end, the lip pivoted to allow the lip and deck of the leveler to flex relative to each other to compensate for differences in height between the dock surface and the bed of the rail car. The dock leveler and the lip may be powered by a hydraulic, mechanical or other techniques to move between the vertical position to the horizontal position. Various other elements such as mechanical locks to prevent falling in the event of power failure and the like may also be used but these are not necessary to the proper understanding of this invention. Those details are found in commercially available devices such as the SERCO RHL Series of rail ramps.

In FIG. 1, a track assembly 1 is cast into concrete at the edge of a loading dock. This track assembly, as illustrated, has a channel steel member 1 generally embedded into the concrete in a U-manner. An upper rail is fixed to the track assembly and comprises a member 21 extending outwardly from the edge of the dock and a vertically extending fixed rail member 22. A lower rail is also fixed to the track assembly 1 and comprises an outwardly extending portion 31 and a vertical portion 32 in alignment with the upper rail 22.

A carriage assembly 4 travels along the rail assembly and has mounted to it the dock leveler 9. The carriage assembly includes frame comprising a vertical member 41, an upper horizontal frame 42, an intermediate support 43 and a lower support 44. A first roller 5 which bears against the inner surface of the top rail 22 is mounted from rotation on the support 43. A roller 6 is also attached to the carriage assembly frame 41 and bears against the top of the lower rail 32. A third roller 7 is attached to the carriage assembly member 44 and bears against the inner surface of the lower rail 3. A fourth roller 8 as shown partially in FIG. 1 is attached to the carriage assembly and bears against the outer surface of the lower rail 32.

Thus, as illustrated in FIG. 1, each of the rollers 5, 6, 7 and 8 is mounted for rotation about an axis shown by the chain lines so that they rotate in the case of rollers 5, 7 and 8 on the vertically extending portions of the rails 22 and 32, and in the case of roller 6 on the top or horizontal surface of roller 32. With this arrangement, rollers 5, 7, and 8 provide for movement relative to the rails 22 and 32 without any horizontal movement. The weight of the assembly is borne by the roller 6 which rotates on the top of the lower rail 32.

The dock leveler assembly is shown schematically as element 9 which pivots about a pin 10 mounted to the carriage assembly 4. While not illustrated, it can be appreciated that the dock leveler lip assumes different positions depending on the orientation of the leveler. When the leveler is up in the stored position In the inoperative position that is, the stored vertical position illustrated in FIG. 1, the lip is extended so that the leveler can be lowered directly on to the rail car. The lip may be lowered to a pendant position (folded) as the leveler is lowered into the operative position to allow end loading which is required if the vehicle is too full to permit the lip in the rail car. Those details of the dock leveler per se are well known in the art and are represented by a number of commercially known vertically stored dock levelers.

In accordance with this invention, the leveler is stored vertically and moved into position along its own rails until it is in alignment with the rail car to loaded or unloaded. The leveler is then lowered into position by a mechanism, not illustrated. At the same time that the leveler is lowered, a brake arm assembly is actuated to lock the leveler in its lateral position, that is, to constrain it from lateral movement on the rails 22 and 32.

A bar 11 is attached to the underside of the deck assembly 9. A brake actuating arm 12 pivots about a pin 13 which is attached to the carriage assembly frame member 40 and bears against the pin 11. An adjusting screw 14 is mounted by a plate 45 onto the brake actuating arm. A brace member 46 welded to both the arm 12 and the plate 45 provides rigidity. A brake pad 16 having a backing plate 15 is mounted on the carriage assembly 41 for sliding movement to bear against the rail 32. As illustrated in the figures the brake pad 16 and backing plate are mounted for sliding movement in a frame or holder 47 fixed to carriage member 41. Also as illustrated in the figures, the roller 8 is laterally displaced relative to the brake assembly so that it contacts one portion of the rail 32 while the brake member 16 contacts a different part of the rail.

An optional spring 17 is used to bias the brake actuating arm into the upright position, that is, to release the brake when the leveler is in the inoperative position. The spring is attached to the frame member 41 and to the arm 12 at an intermediate position thereof.

Figure 2:
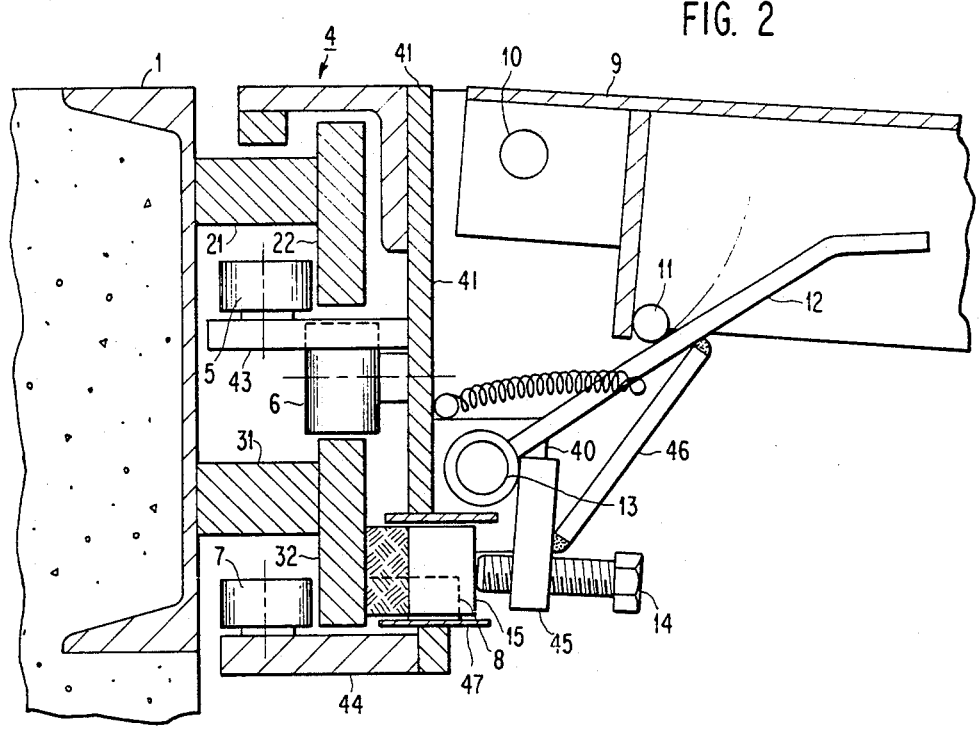
FIG. 2 illustrates the brake mechanism in the engaged position when the dock leveler is in the operative position.

The operation of the device is illustrated in FIGS. 1 and 2 wherein the same elements have been given like numerals. In contrast to FIG. 1, the dock leveler 9 in FIG. 2 has been lowered into its operative position. In this working position the lip would rest on the rail car. The brake actuating arm 12 is rotated clockwise to its maximum position and causes the adjusting screw 14 to bear against the backing plate 15. This, in turn, forces the brake pad 16 against the rail 32. By having the brake pad 16 in frictional contact with the rail 32, lateral movement of the leveler is eliminated.

The braking force can be adjusted by turning the screw 14. The braking force is essentially constant throughout the working range of the dock leveler because the brake actuating arm 12 is approximately tangent to the path of the bar 11 as illustrated in FIG. 2. Thus, the movement of the deck assembly 9, when in the lowered position results in negligible movement of the brake actuating arm 12. Consequently the brake force remains constant.

When the loading-and/or-unloading operation is completed the dock leveler is raised from the position shown in FIG. 2 to that illustrated in FIG. 1. The spring 17 causes the brake actuating arm 12 to rotate counterclockwise thus removing all pressure from the brake pad 16. The spring is, however, optional and need not be used. That is, with the dock leveler in the vertical position there would be no downward force on the actuating arm 12. While there may be some residual drag on the brake element, essentially there would be little or no pressure on the pad itself.

In either case, the carriage assembly 4 is free to roll along the tracks 22 and 32 on rollers 5. 6. 7 and 8. The deck assembly 9 mounted on the carriage can thus be laterally moved along the rails until it is repositioned next to the car to be loaded or unloaded. The deck assembly 9 would then be lowered into the working position and the bar 11 on the leveler rotates about the pin 10 causing the brake actuating arm 12 to rotate clock wise thus engaging adjusting screw 14 to bear against the backing plate and lock the assembly into its lateral position.

It is apparent that modifications of this invention may be practiced without departing from the essential thereof.

Having described my invention I claim:

1. Apparatus comprising:
   a base, a rail means mounted to said base,
   a carriage mounted on said rail means for movement relative to said base.
   a dockboard mounted to said carriage, said dockboard stored in a generally vertical inoperative position and movable downward into a generally horizontal operative position,
   actuating arm means pivotably connected to said carriage and movable in response to movement of said dockboard from said inoperative to said operative position, and
   brake means mounted on said carriage and responsive to movement of said actuating arm means wherein said brake means is urged into contact with said rail means when said dockboard is in said operative position to prevent movement of said carriage relative to said base.

2. Apparatus of claim 1 further comprising:
   spring means to bias said actuating arm means into contact with said dockboard.

3. Apparatus of claim 2 further comprising a bar mounted on said dockboard and said spring means biases said actuating arm means against said bar.

4. Apparatus of claim 1 wherein said actuating arm means comprise an elongated arm extending from a pivot pin, a plate coupled to said elongated arm, an adjustable screw threaded into said plate and a brace member coupling said elongated arm and said plate.

5. Apparatus of claim 2 wherein said brake means comprises a brake pad and a backing plate mounted on said carriage, said adjustable screw contacting said backing plate to urge said brake pad into contact with said rail.

6. Apparatus of claim 1 wherein said brake means comprises a brake pad and a backing plate mounted on said carriage, said actuating arm means contacting said backing plate to restrain movement of said carriage on said rail.

7. Apparatus of claim 1 wherein said rail means comprises an upper rail and a lower rail, said carriage comprising a series of rollers contacting said upper and lower rails to support said carriage on said rails for movement thereon.

8. Apparatus of claim 7 wherein said series of rollers comprises a first roller contacting a side of said upper rail, and second, third and fourth rollers contacting sides and the top of said lower rail.

9. Apparatus of claim 7 wherein said brake means comprises a brake pad urged into contact with said lower rail when said dockboard is in said operative position.

* * * * *